United States Patent [19]
Miyano

[11] Patent Number: 5,875,337
[45] Date of Patent: Feb. 23, 1999

[54] MODIFIER FOR A PROGRAM EXECUTING PARALLEL PROCESSES THAT REDUCES WAIT TIME FOR ACCESS TO A SHARED RESOURCE

[75] Inventor: Takeshi Miyano, Tokyo, Japan

[73] Assignee: NEC Corporation, Tokyo, Japan

[21] Appl. No.: 713,860

[22] Filed: Sep. 13, 1996

[30] Foreign Application Priority Data

Sep. 14, 1995 [JP] Japan .................................. 7-237227

[51] Int. Cl.⁶ ....................................................... G06F 9/30
[52] U.S. Cl. .......................... 395/706; 395/709; 395/672
[58] Field of Search .................................. 395/705, 701, 395/670, 706, 708, 704, 672, 703, 709; 364/280.4

[56] References Cited

U.S. PATENT DOCUMENTS

| | | | |
|---|---|---|---|
| 4,885,684 | 12/1989 | Austin et al. | 395/708 |
| 5,067,072 | 11/1991 | Talati et al. | 395/706 |
| 5,241,633 | 8/1993 | Nishi | 395/392 |
| 5,504,869 | 4/1996 | Uchida | 395/390 |
| 5,564,029 | 10/1996 | Ueda et al. | 395/392 |
| 5,655,422 | 8/1997 | Wu | 395/705 |

OTHER PUBLICATIONS by BAUER, Barr E., "Practical Parallel Programming", *Academic Press, Inc.*, 1992, pp. vii–xii and 173–180.

*Primary Examiner*—James P. Trammell
*Assistant Examiner*—Matthew Smithers
*Attorney, Agent, or Firm*—Young & Thompson

[57] ABSTRACT

A compiler section 15 converts a source program into an object program. A load module-executing section 12 outputs information on the portion placed in the wait state due to exclusive control during parallel processing of a source program 11, to an execution information-storing file section 13. A source program-reprogramming section 16 reprograms the source program, based on the information from the execution information-storing file section 13, by interchanging the portion under exclusive control with another interchangeable portion to prevent occurrence of the wait time due to the exclusive control.

24 Claims, 6 Drawing Sheets

MODIFIER FOR A PROGRAM EXECUTING PARALLEL PROCESSES THAT REDUCES WAIT TIME FOR ACCESS TO A SHARED RESOURCE

BACKGROUND OF THE INVENTION

1. Field of the Invention

The present invention relates to a modifier for programs containing parallel processes which modifies programs containing parallel processes for more efficient execution thereof by a multiprocessor, and more particularly to a modifier for programs containing parallel processes so that the wait time due to exclusive control, which is encountered when the parallel processes access a process-shared resource, is minimized. The invention also relates to a modifying method and a memory medium for storing modified programs.

2. Description of the Related Art

Bauer, *Practical Parallel Programming,* Academic Press, Inc., 1992 describes a technique for multiprocessing systems, in which a critical block is defined when a parallel process accesses a process-shared resource, to thereby prohibit accessing by the other processes to the resource during parallel execution of a plurality of processes.

This technique of the prior art, which inevitably prevents the other processes from accessing the resource until the process-shared-resource accessing process releases the critical block, has the problem of delaying initiation of the execution times of programs containing the other processes.

SUMMARY AND OBJECTS OF THE INVENTION

It is an object of the present invention to provide an apparatus for modifying programs containing parallel processes for more efficient execution thereof in a multiprocessor.

It is another object of the present invention to provide an apparatus for modifying programs so that the wait time due to exclusive control, which is encountered when the parallel processes access a process-shared resource, is minimized.

A first modifier according to the present invention for programs containing parallel processes, which is used in multiprocessing systems for executing a plurality of processes in parallel by a plurality of processors, comprises the following components:

load module-executing means which executes an object program containing the plurality of processes and stores an access instruction in the object program which waits for its execution each time the wait state for accessing a resource is caused during execution of the plurality of processes; and source program-reprogramming means which modifies the source program of the object program so that a first instruction stream which contains the access instruction stored in the load module-executing means is interchanged with a second instruction stream in the process containing the first instruction stream which does not access the resource which the access instruction has given instruction to access.

A second modifier according to the present invention for programs containing parallel processes comprises the following requirement in addition to the requirements for the first modifier for programs containing parallel processes:

the conditions under which the source program-reprogramming means specifies the second instruction stream include an additional condition that a process having a data-dependence relationship with the resource must not be involved.

A third modifier according to the present invention for programs containing parallel processes comprises the following requirement in addition to the requirements for the first modifier for programs containing parallel processes:

the conditions under which the source program-reprogramming means specifies the second instruction stream include an additional condition that there is neither a function call nor a branching process which produces a side effect, between the first and the second instruction streams.

A fourth modifier according to the present invention for programs containing parallel processes comprises the following requirement in addition to the requirements for the second modifier for programs containing parallel processes:

the conditions under which the source program-reprogramming means specifies the second instruction stream include an additional condition that there is neither a function call nor a branching process which produces a side effect, between the first and the second instruction streams.

A fifth modifier according to the present invention for programs containing parallel processes comprises the following requirement in addition to the requirements for the first modifier for programs containing parallel processes:

the conditions under which the source program-reprogramming means specifies the second instruction stream include an additional condition that the stream has a maximum processing time.

A sixth modifier according to the present invention for programs containing parallel processes comprises the following requirement in addition to the requirements for the second modifier for programs containing parallel processes:

the conditions under which the source program-reprogramming means specifies the second instruction stream include an additional condition that the stream has a maximum processing time.

A seventh modifier according to the present invention for programs containing parallel processes comprises the following requirement in addition to the requirements for the third modifier for programs containing parallel processes:

the conditions under which the source program-reprogramming means specifies the second instruction stream include an additional condition that the stream has a maximum processing time.

A eighth modifier according to the present invention for programs containing parallel processes comprises the following requirement in addition to the requirements for the fourth modifier for programs containing parallel processes:

the conditions under which the source program-reprogramming means specifies the second instruction stream include an additional condition that the stream has a maximum processing time.

A first method according to the present invention for modifying programs containing parallel processes, which is used in multiprocessing systems for executing a plurality of processes in parallel by a plurality of processors, comprises the following steps:

a load module-executing step of executing an object program containing the plurality of processes and storing an access instruction in the object program which waits for its execution each time the wait state for accessing a resource is caused during execution of the plurality of processes; and a source program-reprogramming step of modifying the source program of the object program so that a first instruction stream which contains the access instruction stored in the load module-executing step is interchanged with a second instruction stream in the process containing the first instruction stream which does not access the resource which the access instruction has given instruction to access.

A second method according to the present invention for modifying programs containing parallel processes comprises the following requirement in addition to the requirements for the first method of modifying programs containing parallel processes:

the conditions under which the source program-reprogramming step is carried out to specify the second instruction stream include an additional condition that a process having a data-dependence relationship with the resource must not be involved.

A third method according to the present invention for modifying programs containing parallel processes comprises the following requirement in addition to the requirements for the first method of modifying programs containing parallel processes:

the conditions under which the source program-reprogramming step is carried out to specify the second instruction stream include an additional condition that there is neither a function call nor a branching process which produces a side effect, between the first and the second instruction streams.

A fourth method according to the present invention for modifying programs containing parallel processes comprises the following requirement in addition to the requirements for the second method for programs containing parallel processes:

the conditions under which the source program-reprogramming step is carried out to specify the second instruction stream include an additional condition that there is neither a function call nor a branching process which produces a side effect, between the first and the second instruction streams.

A fifth method according to the present invention for modifying programs containing parallel processes comprises the following requirement in addition to the requirements for the first method of modifying programs containing parallel processes:

the conditions under which the source program-reprogramming step is carried out to specify the second instruction stream include an additional condition that the stream has a maximum processing time.

A sixth method according to the present invention for modifying programs containing parallel processes comprises the following requirement in addition to the requirements for the second method of modifying programs containing parallel processes:

the conditions under which the source program-reprogramming step is carried out to specify the second instruction stream include an additional condition that the stream has a maximum processing time.

A seventh method according to the present invention for modifying programs containing parallel processes comprises the following requirement in addition to the requirements for the third method of modifying programs containing parallel processes:

the conditions under which the source program-reprogramming step is carried out to specify the second instruction stream include an additional condition that the stream has a maximum processing time.

A eighth method according to the present invention for modifying programs containing parallel processes comprises the following requirement in addition to the requirements for the fourth method of modifying programs containing parallel processes:

the conditions under which the source program-reprogramming step is carried out to specify the second instruction stream include an additional condition that the stream has a maximum processing time.

A first memory medium according to the present invention stores a program for executing a process including the following steps by a plurality of processors which execute a plurality of processes in parallel:

a load module-executing step of executing an object program containing the plurality of processes and storing an access instruction in the object program which waits for its execution each time the wait state for accessing a resource is caused during execution of the plurality of processes; and a source program-reprogramming step of modifying the source program of the object program so that a first instruction stream which contains the access instruction stored in the load module-executing step is interchanged with a second instruction stream in the process containing the first instruction stream which does not access the resource which the access instruction has given instruction to access.

A second memory medium according to the present invention stores the program with the following requirement in addition to the requirements for the first memory medium:

the conditions under which the source program-reprogramming step is carried out to specify the second instruction stream include an additional condition that a process having a data-dependence relationship with the resource must not be involved.

A third memory medium according to the present invention stores the program with the following requirement in addition to the requirements for the first memory medium:

the conditions under which the source program-reprogramming step is carried out to specify the second instruction stream include an additional condition that there is neither a function call nor a branching process which produces a side effect, between the first and the second instruction streams.

A fourth memory medium according to the present invention stores the program with the following requirement in addition to the requirements for the second memory medium:

the conditions under which the source program-reprogramming step is carried out to specify the second instruction stream include an additional condition that there is neither a function call nor a branching process which produces a side effect, between the first and the second instruction streams.

A fifth memory medium according to the present invention stores the program with the following requirement in addition to the requirements for the first memory medium:

the conditions under which the source program-reprogramming step is carried out to specify the second instruction stream include an additional condition that the stream has a maximum processing time.

A sixth memory medium according to the present invention stores the program with the following requirement in addition to the requirements for the second memory medium:

the conditions under which the source program-reprogramming step is carried out to specify the second instruction stream include an additional condition that the stream has a maximum processing time.

A seventh memory medium according to the present invention stores the program with the following requirement in addition to the requirements for the third memory medium:

the conditions under which the source program-reprogramming step is carried out to specify the second instruction stream include an additional condition that the stream has a maximum processing time.

A eighth memory medium according to the present invention stores the program with the following requirement in addition to the requirements for the fourth memory medium:

the conditions under which the source program-reprogramming step is carried out to specify the second instruction stream include an additional condition that the stream has a maximum processing time.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

Here, it should be noted that like reference numerals represent like elements throughout the disclosure.

DETAILED DESCRIPTION OF THE PREFERRED EMBODIMENTS

Embodiments of the present invention will now be explained with reference to the drawings.

Figure 1:
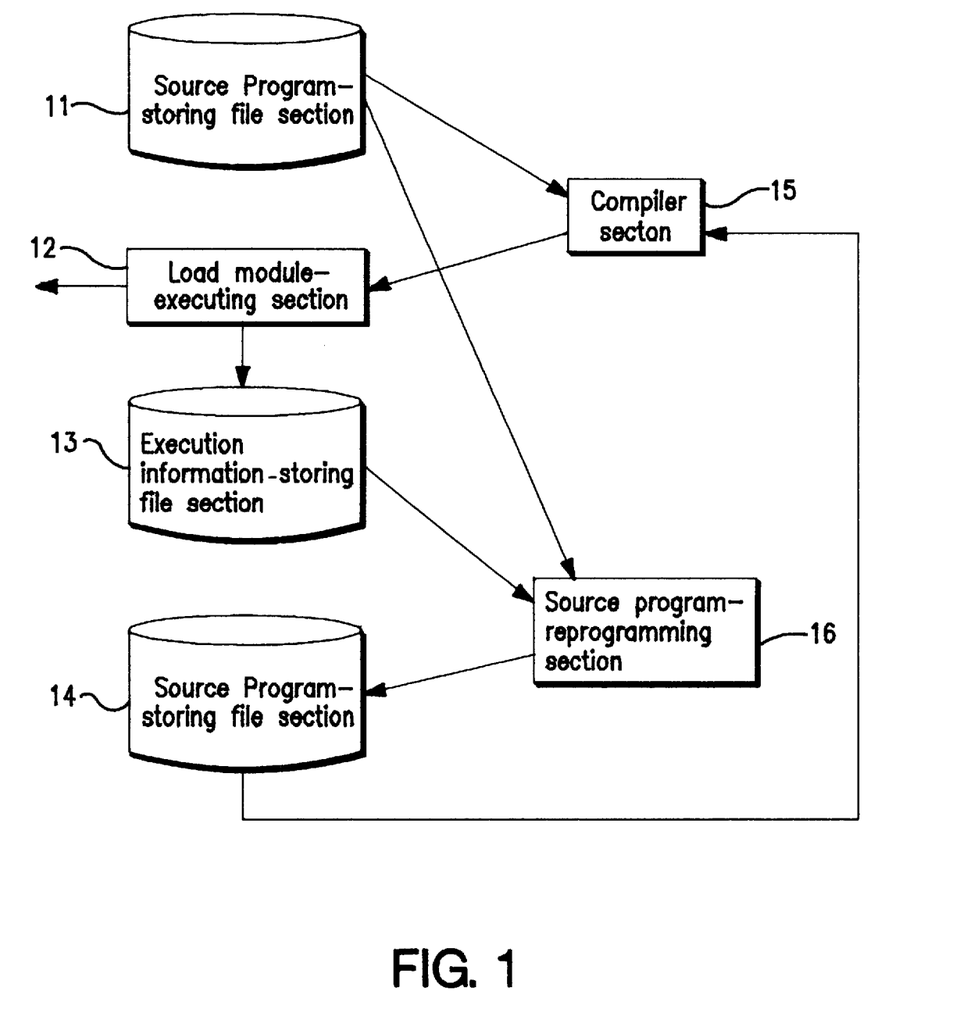
FIG. 1 is a block diagram illustrative of a modifier for programs containing parallel processes according to first and second embodiments of the present invention.

Referring to FIG. 1, an embodiment of a modifier according to the present invention for programs containing parallel processes comprises a first source program-storing file section 11, a load module-executing section 12, an execution information-storing file section 13, a second source program-storing file section 14, a compiler section 15 and a source program-reprogramming section 16.

The first source program-storing section 11 stores a source program containing parallel processes.

The compiler section 15 fetches a source program from the first source program-storing file section 11 and compiles the source program into an object program to supply the object program as a load module (LM) to the load module-executing section 12.

The load module-executing section 12 comprises a multiprocessing section having first and second processors, and executes the load module-type object program in such a manner that parallel processes of the load module-type object program are executed by the first and the second processors as first and second tasks.

With this load module-executing section 12, when there are blocks in the first and the second tasks which access the same resource at the same time during parallel execution of the first and the second tasks by the first and the second processors, the second processor must wait to execute the block until the first processor finishes accessing the resource. In other words, the second processor is placed in the wait state due to the exclusive control by the first processor.

The load module-executing section 12 has a block-specifying information output section (not shown) which detects the wait state of the second processor and outputs block-specifying information which specifies the block in the wait state, execution of which by the second processor is therefore delayed, as a specific block.

The execution information-storing file section 13 stores the block-specifying information as stored information.

The block-specifying information specifies, for example, the line number of the block in the wait state for which execution is expected (that is, the block of the source program which is in the wait state), and the block-specifying information is stored in the execution information-storing file section 13 as an execution-waiting LM.

Based on both the source program supplied by the first source program-storing file section 11 and the stored information supplied by the execution information-storing file section 13, the source program-reprogramming section 16 interchanges the specific block of the source program which is specified based on the stored information with another block which is programmed to be executed by the second processor as the second task later than the specific block and does not access the resource, to thereby reprogram the source program as another program which is then outputted.

Here, based on the information from the execution information-storing file section 13, the source program-reprogramming section 16 identifies the block which has been placed in the wait state due to the exclusive control, detects a block with a maximum execution time which is interchangeable with the block in the wait state and interchange the block with the block in the wait state due to the exclusive control to output another source program.

The second source program-storing file section 14 stores the other source program.

Upon receipt of the other source program supplied by the second source program-storing file section 14, the compiler section 15 compiles the other source program into another object program.

The load module-executing section 12 executes the other object program so that first and second tasks of the other object program are executed by the first and the second processors.

Here, in addition to the compiler section 15, another compiler section may be provided which is supplied with another source program by the second source program-storing file section 14, compiles the other source program into another object program and supplies the object program to the load module-executing section 12.

A first embodiment of the modifier according to the present invention for programs containing parallel processes which is constructed as described above will now be explained in detail with reference to FIG. 1 through FIG. 6.

Figure 2:
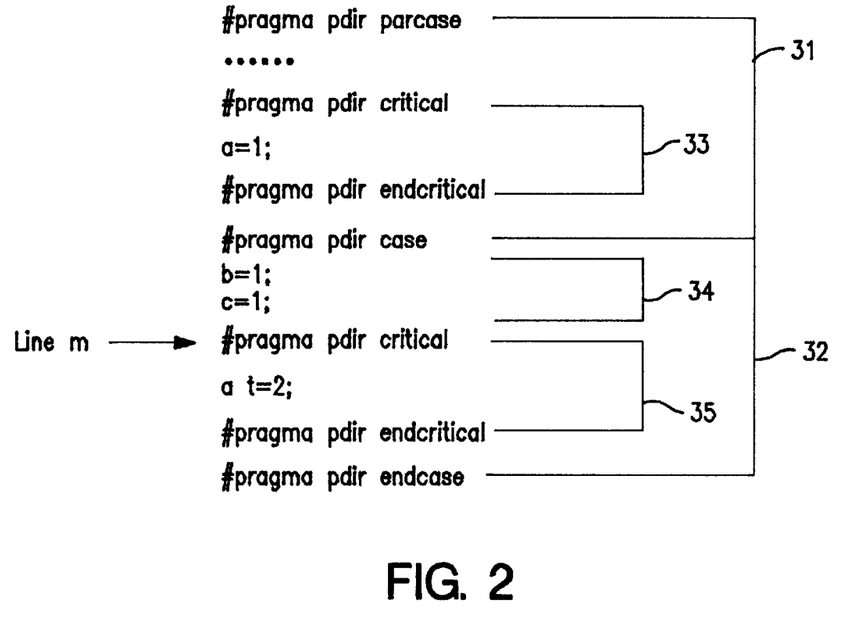
FIG. 2 is a view illustrative of an example of a source program according to the first embodiment of the preset invention.

First, an explanation will be given regarding a case where a source program described in C language which is illustrated in FIG. 2 is executed in parallel by two processors according to the present embodiment.

Referring to FIG. 2, parallelized case blocks 31 and 32 of the source program are blocks which are executed in parallel by separate processors. The variable a is common data among the tasks, whereas the variables b and c are local data within the tasks. Blocks 33 and 35 in the parallelized case blocks 31 and 32 which access a common area among the tasks are blocks which are executed under exclusive control. The blocks are called critical sections.

When the critical sections are attempted to be executed, the compiler section 15 generates an object program which contains a series of instructions for executing the following processing.

(1) When the value of the flag set in the task-common area which indicates progress of execution of the other twin critical section is off, the flag is switched on to execute the critical section.

(2) When the flag is on, the wait state is maintained until the flag is switched off. At the instant the flag is switched off, the wait-state time and the line number of the critical section in the source which is being executed are outputted to the execution information-storing file section 13 to perform the processing in (1).

Figure 3:
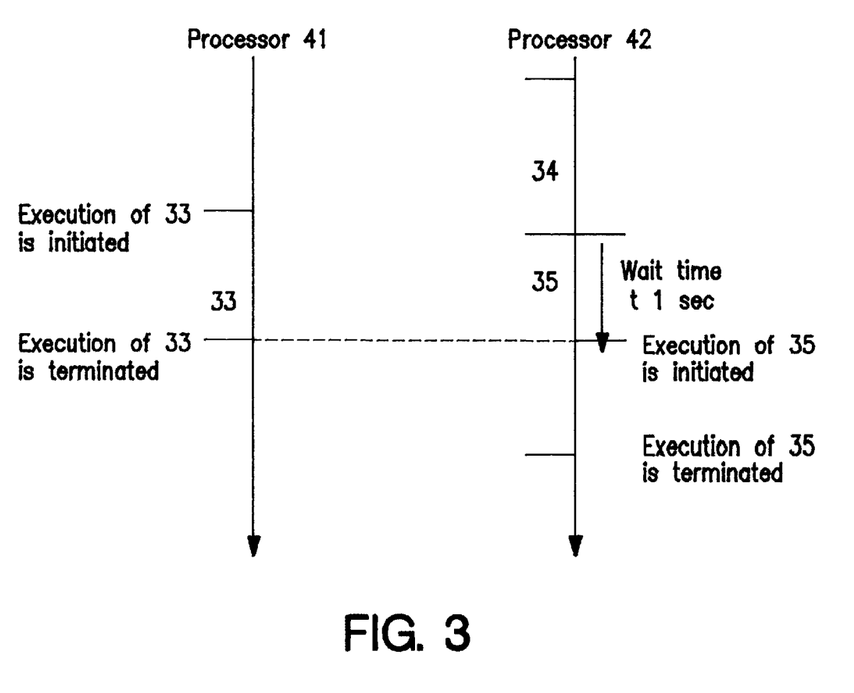
FIG. 3 is a view illustrative of the time-dependent progress of instructions executed by the respective processors when an object program compiled from the source program illustrated in FIG. 2 is executed.

FIG. 3 illustrates the time-dependent progress of instructions executed by the respective processors when the object program generated by the compiler section 15 is executed.

Assuming that in cases where the processor 41 is in the course of execution of the other critical section 33 when the processor 42 attempts to initiate execution of the critical section 35, and thus the critical section 35 is placed in the wait state for t1 seconds, the line number m of the critical section 35 is outputted to the execution information-storing file section 13.

The source program-reprogramming section 16 reads the execution information-storing file section 13 to find the line number m which has caused the wait state to thereby recognize occurrence of the wait state of the critical section 35 for selection of a block which is interchanged with the critical section 35.

Figure 4:
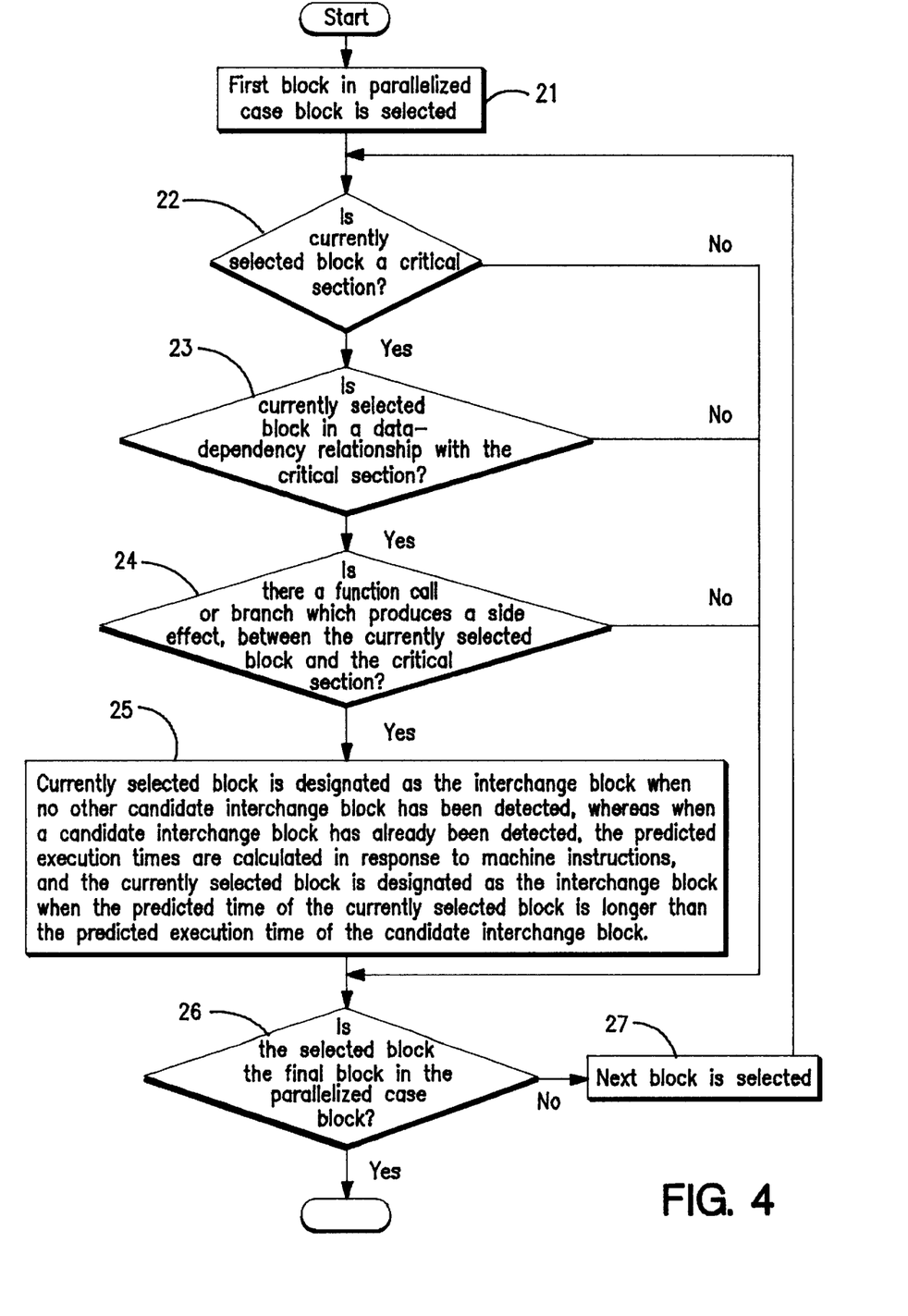
FIG. 4 is a flow chart illustrative of the processing according to the first and the second embodiments of the present invention by the source program-reprogramming section 16.

The process will now be explained with reference to the flow chart of FIG. 4.

1. The first block 34 in the parallelized case block 32 is selected (step 21).

2. It is determined whether the selected block 34 matches the critical section 35 which has been placed in the wait state (step 22). Since a mismatch occurs in the case of FIG. 3, the process proceeds to step 23.

3. It is determined whether the selected block 34 has a data-dependency relationship with the critical section 35 (step 23). Since no such dependency relationship exists in the case of FIG. 3, the process proceeds to step 24.

4. It is determined whether there is a function call or a branch between the selected block 34 and the critical section 35 (step 24). Since both are absent in the case of FIG. 3, the process proceeds to step 25.

5. Since no other candidate interchange block is detected, the selected block 34 is designated as the interchange block (step 25).

6. It is determined whether the selected block 34 is the final block in the parallelized case block 32 (step 26). Since the block is not the final block in the case of FIG. 3, the process proceeds to step 27.

7. The next block 35 is selected, and the process returns to step 22 (step 27).

8. Since the selected block is the critical section 35, the process proceeds to step 26 (step 22).

9. It is determined whether the selected block 35 is the final block in the parallelized case block 32 (step 26). Since the selected block is the final block in the case of FIG. 3, the process is terminated.

The block 34 is selected as the interchange block by the process performed as described above.

Figure 5:
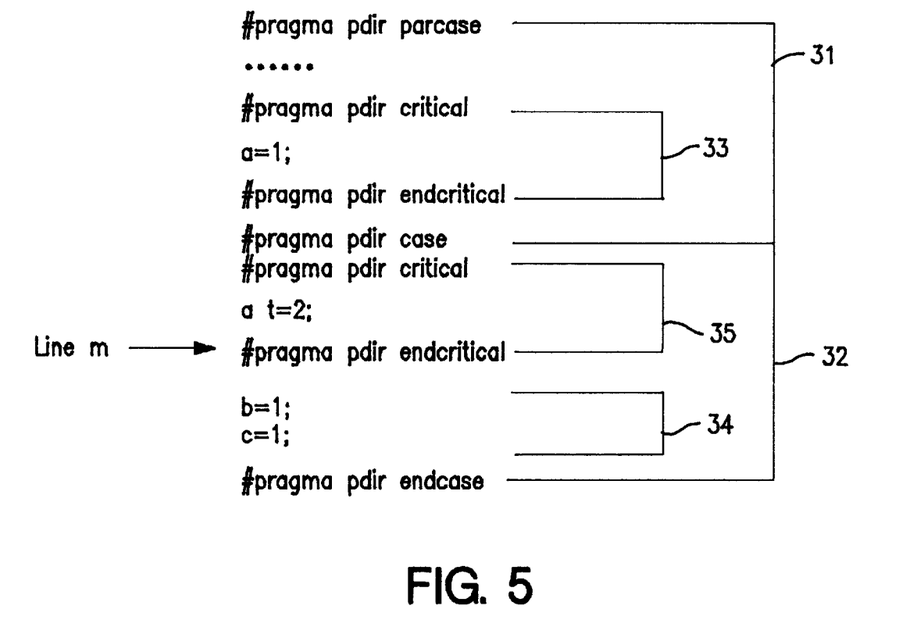
FIG. 5 is a view illustrative of a source program generated by reprogramming the source program illustrated in FIG. 2 by the source program-reprogramming section 16.

The source program-reprogramming section 16 outputs a source program illustrated in FIG. 5 which has been generated by interchange between the block 34 and the critical section 35.

Figure 6:
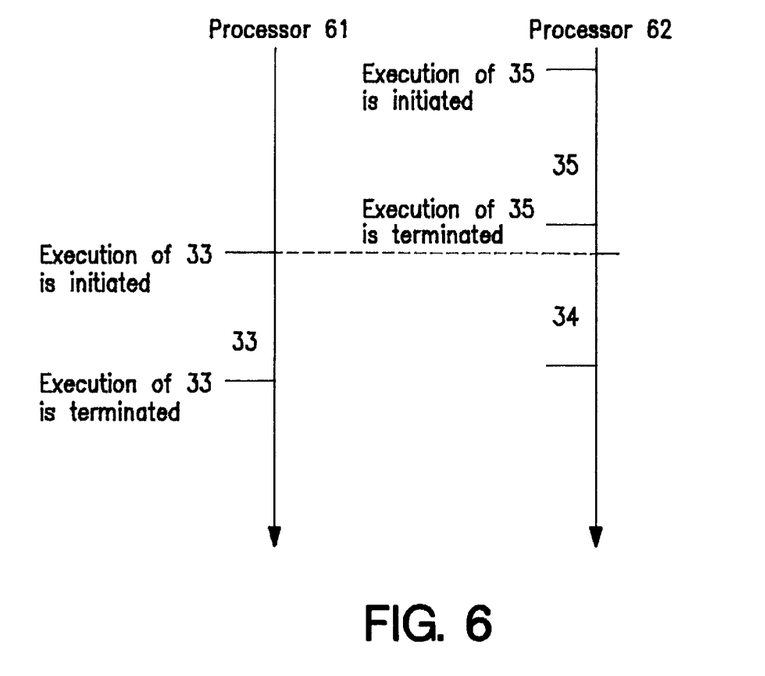
FIG. 6 is a view illustrative of the time-dependent progress of instructions executed by the respective processors when an object program compiled from the source program illustrated in FIG. 5 is executed.

FIG. 6 illustrates the time-dependent progress of instructions which are executed by the respective processors when the source program illustrated in FIG. 5 is recompiled and executed; no wait time is caused since the processor 61 does not execute the critical section 33 while the processor 62 executes the critical section 35.

The processing of programs containing parallel processes by the first embodiment of the modifier according to the present invention may be accomplished as described above.

Being designed so that the load module-executing section 12 stores the information of the block placed in the wait state due to exclusive control encountered during parallel processings of a source program, in the execution information-storing file section 13 and the source program-reprogramming section 16 interchanges the block in the wait state with another block on the basis of the information on the source program and the block, the first embodiment of the modifier according to the present invention for programs containing parallel processes has the effect of reprogramming the source program without causing the wait time due to exclusive control.

A second embodiment of the modifier according to the present invention which is constructed as described before for programs containing parallel processes will now be explained in detail with reference to FIG. 4 and FIG. 7 through FIG. 10.

Figure 7:
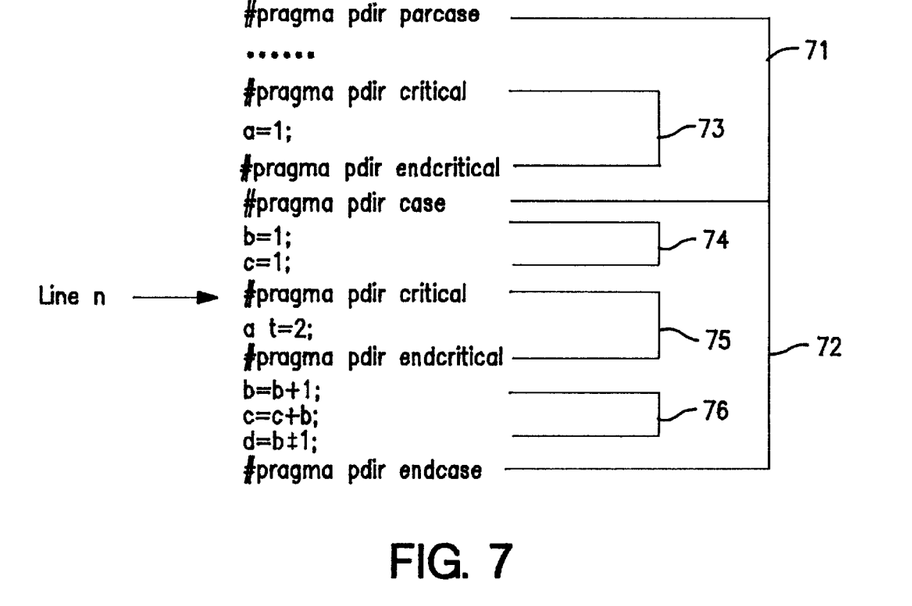
FIG. 7 is a view illustrative of an example of a source program according to the second embodiment of the preset invention.

First, assuming that a source program described in C language which is illustrated in FIG. 7 is executed in parallel by two processors according to the present embodiment.

Referring to FIG. 7, parallelized case blocks 71 and 72 of the source program are blocks which are executed in parallel by separate processors. The variable a is common data among the tasks, whereas the variables b and c are local data within the tasks. Blocks 73 and 75 in the parallelized case blocks 71 and 72 which access a common area a among the tasks are critical sections.

When the critical sections are attempted to be executed, the compiler section 15 generates an object program which contains a series of instructions for executing the following processing.

(1) When the value of the flag set in the task-common area which indicates progress of execution of the other twin critical section is off, the flag is switched on to execute the critical section.

(2) When the flag is on, the wait state is maintained until the flag is switched off. At the instant the flag is switched off, the wait-state time and the line number of the critical section in the source which is being executed are outputted to the execution information-storing file section 13 to perform the processing in (1).

Figure 8:
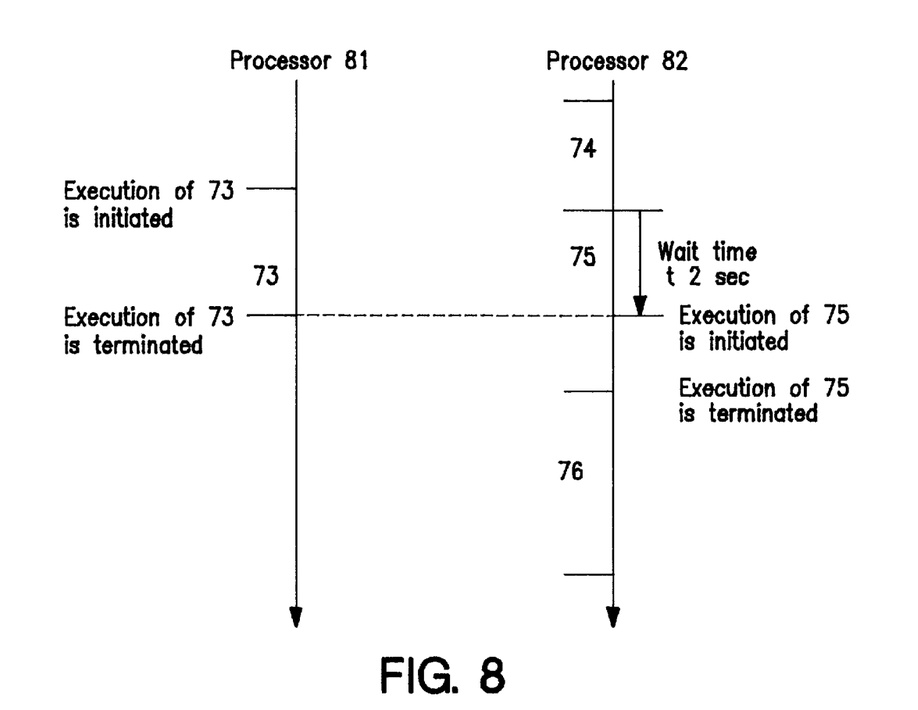
FIG. 8 is a view illustrative of the time-dependent progress of instructions executed by the respective processors when an object program compiled from the source program illustrated in FIG. 7 is executed.

FIG. 8 illustrates the time-dependent progress of instructions executed by the respective processors when the object program generated by the compiler section 15 is executed.

Assuming that in cases where the processor 81 is in the course of execution of the other critical section 73 when the processor 82 attempts to initiate execution of the critical section 75, and thus the critical section 75 is placed in the wait state for t2 seconds, the line number n of the critical section 75 is outputted to the execution information-storing file section 13.

The source program-reprogramming section 16 reads the execution information-storing file section 13 to find the line number n which has caused the wait state to thereby recognize occurrence of the wait state of the critical section 75 for selection of a block which is interchanged with the critical section 75.

The process will now be explained with reference to the flow chart of FIG. 4.

1. The first block 74 in the parallelized case block 72 is selected (step 21).

2. It is determined whether the selected block 74 matches the critical section 75 which has been placed in the wait state (step 22). Since a mismatch occurs in the case of FIG. 8, the process proceeds to step 23.

3. It is determined whether the selected block 74 has a data-dependency relationship with the critical section 75 (step 23). Since no such dependency relationship exists in the case of FIG. 8, the process proceeds to step 24.

4. It is determined whether there is a function call or a branch between the selected block 74 and the critical section 75 (step 24). Since both are absent in the case of FIG. 8, the process proceeds to step 25.

5. Since no other candidate interchange block is detected, the selected block 74 is designated as the interchange block (step 25).

6. It is determined whether the selected block 74 is the final block in the parallelized case block 72 (step 26). Since the block is not the final block in the case of FIG. 8, the process proceeds to step 27.

7. The next block 75 is selected, and the process returns to step 22 (step 27).

8. Since the selected block is the critical section 75, the process proceeds to step 26 (step 22).

9. It is determined whether the selected block 75 is the final block in the parallelized case block 72 (step 26). Since the selected block is not the final block in the case of FIG. 8, the process proceeds to step 27.

10. The next block 76 is selected, and the process returns to step 22 (step 27).

11. It is determined whether the selected block 76 matches the critical section 74 which has been placed in the wait state (step 22). Since a mismatch occurs in the case of FIG. 8, the process proceeds to step 23.

12. It is determined whether the selected block 76 has a data-dependency relationship with the critical section 75 (step 23). Since no such dependency relationship exists in the case of FIG. 8, the process proceeds to step 24.

13. It is determined whether there is a function call or a branch between the selected block 76 and the critical section 75 (step 24). Since both are absent in the case of FIG. 8, the process proceeds to step 25.

14. Since the candidate interchange block 74 has already been detected, the predicted execution time of the interchange block 76 is compared with the predicted execution time of the selected block 76. Since the predicted execution time of the selected block 76 is longer, the selected block 76 is designated as the interchange block (step 25).

15. It is determined whether the selected block 76 is the final block in the parallelized case block 72 (step 26). Since the selected block is the final block in the case of FIG. 8, the process is terminated.

The block 76 is selected as the interchange block by the process performed as described above.

Figure 9:
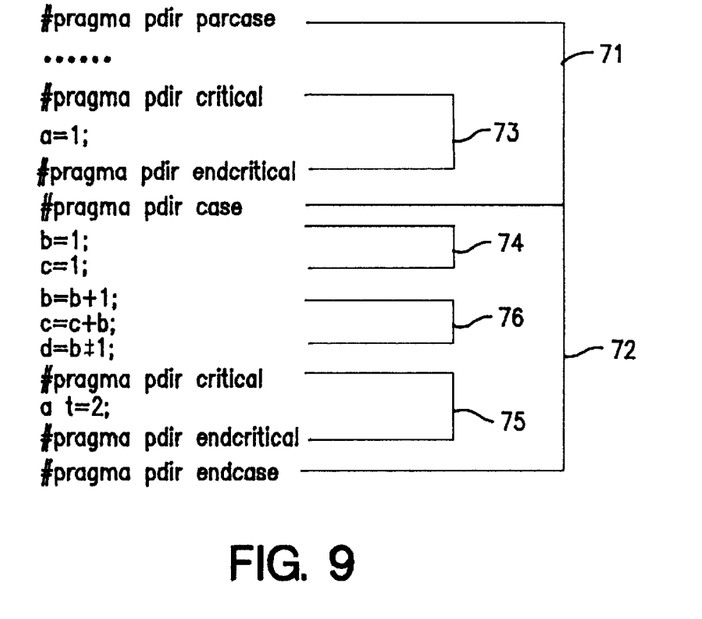
FIG. 9 is a view illustrative of a source program generated by reprogramming the source program illustrated in FIG. 7 by the source program-reprogramming section 16.

The source program-reprogramming section 16 outputs a source program illustrated in FIG. 9 which has been generated by interchange between the interchange block 76 and the critical section 75.

Figure 10:
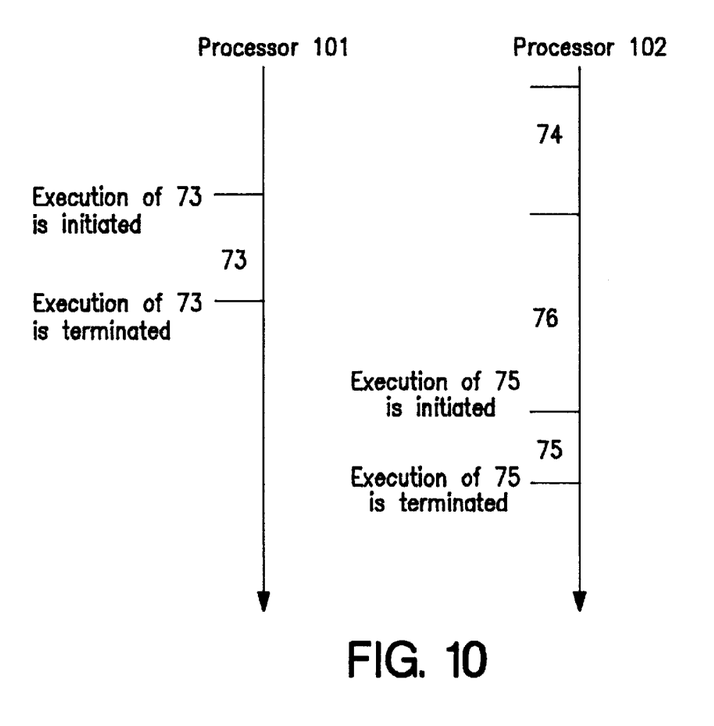
FIG. 10 is a view illustrative of the time-dependent progress of instructions executed by the respective processors when an object program compiled from the source program illustrated in FIG. 9 is executed.

FIG. 10 illustrates the time-dependent progress of instructions which are executed by the respective processors when the source program illustrated in FIG. 9 is recompiled and executed; no wait time is caused since the processor 101 does not execute the critical section 33 while the processor 102 executes the critical section 75.

The processing of programs containing parallel processes by the second embodiment of the modifier according to the present invention may be accomplished as described above.

Being designed so that the load module-executing section 12 stores the information of the block placed in the wait state due to exclusive control encountered during parallel processings of a source program, in the execution information-storing file section 13 and the source program-reprogramming section 16 interchanges the block in the wait state with another block with a maximum execution time on the basis of the information on the source program and the block, the second embodiment of the modifier according to the present invention for programs containing parallel processes has the effect of reprogramming the source program without causing the wait time due to exclusive control.

As described above, the modifier according to the present invention for programs containing parallel processes has the effect of modifying programs containing parallel processes so that the wait time due to exclusive control, which is encountered when the parallel processes access a process-shared resource, is minimized to efficiently execute the program by a multiprocessor.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A modifier for a multiprocessing system, the system for executing a plurality of processes in parallel using a plurality of processors and having a resource that is accessible by the plurality of processes one at a time, the modifier comprising:

load module-executing means for executing an object program containing the plurality of processes, at least two of the plurality of processes having an instruction for accessing the resource; and source program-reprogramming means for modifying a source program corresponding to the object program so that during recompiling of the modified source program into a new object program, a first instruction stream that includes an instruction for accessing the resource and that is in one of the processes that is waiting for access to the resource because the resource has been accessed by another of the plurality of processes is interchanged with a second instruction stream that does not include an instruction for accessing the resource and that is in said one of the processes.

2. A modifier, as claimed in claim 1, wherein said second instruction stream does not include an instruction having a data-dependence relationship with an instruction in said first instruction stream.

3. A modifier, as claimed in claim 2, wherein said second instruction stream does not include a function call instruction or a branch instruction that can cause a side effect to an instruction in said first instruction stream.

4. A modifier, as claimed in claim 2, wherein said second instruction stream has a longer processing time than any instruction stream in the one of the processes.

5. A modifier, as claimed in claim 3, wherein said second instruction stream has a longer processing time than any instruction stream in the one of the processes.

6. A modifier, as claimed in claim 1, wherein said second instruction stream does not include a function call instruction or a branch instruction that can cause a side effect to an instruction in said first instruction stream.

7. A modifier, as claimed in claim 6, wherein said second instruction stream has a longer processing time than any instruction stream in the one of the processes.

8. A modifier, as claimed in claim 1, wherein said second instruction stream has a longer processing time than any instruction stream in the one of the processes.

9. A method of modifying a program for executing a plurality of processes in parallel using a plurality of processors from a multiprocessing system that has a resource that is accessible by the plurality of processes one at a time, the method comprising the steps of:

executing an object program containing the plurality of processes, at least two of the plurality of processes having an instruction for accessing the resource; and modifying a source program corresponding to the object program so that during recompiling of the modified source program into a new object program, a first instruction stream that includes an instruction for accessing the resource and that is in one of the processes that is waiting for access to the resource because the resource has been accessed by another of the plurality of processes is interchanged with a second instruction stream that does not include an instruction for accessing the resource and that is in said one of the processes.

10. A method, as claimed in claim 9, wherein said second instruction stream does not include an instruction having a data-dependence relationship with an instruction in said first instruction stream.

11. A method, as claimed in claim 10, wherein said second instruction stream does not include a function call instruction or a branch instruction that can cause a side effect to an instruction in said first instruction stream.

12. A method, as claimed in claim 10, wherein said second instruction stream has a longer processing time than any instruction stream in the one of the processes.

13. A method, as claimed in claim 11, wherein said second instruction stream has a longer processing time than any instruction stream in the one of the processes.

14. A method, as claimed in claim 9, wherein said second instruction stream does not include a function call instruction or a branch instruction that can cause a side effect to an instruction in said first instruction stream.

15. A method, as claimed in claim 14, wherein said second instruction stream has a longer processing time than any instruction stream in the one of the processes.

16. A method, as claimed in claim 9, wherein said second instruction stream has a longer processing time than any instruction stream in the one of the processes.

17. A program storage device readable by a machine, tangibly embodying instructions executable by the machine to perform a method for modifying a program for executing a plurality of processes in parallel using a plurality of processors from a multiprocessing system that has a resource that is accessible by the plurality of processes one at a time, the method comprising the steps of:

executing an object program containing the plurality of processes, at least two of the plurality of processes having an instruction for accessing the resource; and modifying a source program corresponding to the object program so that during recompiling of the modified source program into a new object program, a first instruction stream that includes an instruction for accessing the resource and that is in one of the processes that is waiting for access to the resource because the resource has been accessed by another of the plurality of processes is interchanged with a second instruction stream that does not include an instruction for accessing the resource and that is in said one of the processes.

18. A program storage device, as claimed in claim 17, wherein said second instruction stream does not include an instruction having a data-dependence relationship with an instruction in said first instruction stream.

19. A program storage device, as claimed in claim 18, wherein said second instruction stream does not include a function call instruction or a branch instruction that can cause a side effect to an instruction in said first instruction stream.

20. A program storage device, as claimed in claim 18, wherein said second instruction stream has a longer processing time than any instruction stream in the one of the processes.

21. A program storage device, as claimed in claim 19, wherein said second instruction stream has a longer processing time than any instruction stream in the one of the processes.

22. A program storage device, as claimed in claim 17, wherein said second instruction stream does not include a function call instruction or a branch instruction that can cause a side effect to an instruction in said first instruction stream.

23. A program storage device, as claimed in claim 22, wherein said second instruction stream has a longer processing time than any instruction stream in the one of the processes.

24. A program storage device, as claimed in claim 17, wherein said second instruction stream has a longer processing time than any instruction stream in the one of the processes.

* * * * *